(12) United States Patent
Yang et al.

(10) Patent No.: US 6,746,622 B2
(45) Date of Patent: Jun. 8, 2004

(54) OXYGEN SCAVENGING COMPOSITIONS COMPRISING POLYMERS DERIVED FROM TETRAHYDROFURFURYL MONOMERS

(75) Inventors: Hu Yang, San Ramon, CA (US); Ta Yen Ching, Novato, CA (US); Lennard Torres, Pleasanton, CA (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 156 days.

(21) Appl. No.: 10/072,806

(22) Filed: Feb. 8, 2002

(65) Prior Publication Data

US 2003/0153644 A1 Aug. 14, 2003

(51) Int. Cl.$^7$ .............................. C09K 3/00; C08F 2/46
(52) U.S. Cl. ............... 252/188.28; 252/600; 252/188.1; 428/34.8; 428/35.4; 428/35.7; 428/35.8; 428/35.9; 428/36.6; 428/36.8; 522/81; 522/46; 522/104; 522/178; 522/182
(58) Field of Search ..................... 252/188.28, 188.1; 428/34.8, 35.4, 35.7, 35.8, 35.9, 36.6, 36.7, 36.8; 522/81, 46, 104, 178, 182

(56) References Cited

U.S. PATENT DOCUMENTS

| | | | |
|---|---|---|---|
| 3,497,571 A | 2/1970 | Tellier et al. ............... 260/844 |
| 4,415,710 A | 11/1983 | Barnabeo et al. ............ 525/370 |
| 4,524,201 A | 6/1985 | Barnabeo et al. ............ 528/395 |
| 5,021,515 A | 6/1991 | Cochran et al. ............. 525/371 |
| 5,116,916 A | 5/1992 | Young ......................... 525/350 |
| 5,153,038 A | 10/1992 | Koyama et al. ............ 428/35.8 |
| 5,211,875 A | 5/1993 | Speer et al. ............ 252/188.28 |
| 5,274,024 A | 12/1993 | Koyama et al. ............ 524/440 |
| 5,281,360 A | 1/1994 | Hong et al. ............. 252/188.28 |
| 5,346,644 A | 9/1994 | Speer et al. ............ 252/188.28 |
| 5,425,896 A | 6/1995 | Speer et al. ............ 252/188.28 |
| 5,466,756 A | 11/1995 | Roach et al. ............... 525/330.6 |
| 5,498,364 A | 3/1996 | Speer et al. ............ 252/188.28 |
| 5,547,765 A | 8/1996 | Degrassi et al. ........... 428/474.7 |
| 5,627,239 A | 5/1997 | Ching et al. .............. 525/330.6 |
| 5,641,825 A | 6/1997 | Bacskai et al. ............. 524/398 |
| 5,656,692 A | 8/1997 | Hayes ........................ 525/63 |
| 5,660,761 A | 8/1997 | Katsumoto et al. .... 252/188.28 |
| 5,700,554 A | 12/1997 | Speer et al. ................. 428/220 |
| 5,707,750 A | 1/1998 | Degrassi et al. .......... 428/475.8 |
| 5,716,715 A | 2/1998 | Degrassi et al. .......... 428/475.8 |
| 5,736,616 A | 4/1998 | Ching et al. .............. 525/330.3 |
| 5,759,653 A | 6/1998 | Collette et al. ............. 428/35.9 |
| 5,763,095 A | 6/1998 | Ramesh et al. ........... 428/474.4 |
| 5,776,361 A | 7/1998 | Katsumoto et al. .... 252/188.28 |
| 5,837,158 A | 11/1998 | Shepodd et al. .......... 252/181.6 |
| 5,859,145 A | 1/1999 | Ching et al. .............. 525/330.6 |
| 5,866,649 A | 2/1999 | Hong et al. ................... 524/538 |
| 6,057,013 A | 5/2000 | Ching et al. ................ 428/35.7 |
| 6,063,307 A | 5/2000 | Shepodd et al. .......... 252/181.6 |
| 6,063,417 A | 5/2000 | Paleari et al. ............... 426/127 |
| 6,139,770 A * | 10/2000 | Katsumoto et al. .... 252/188.28 |
| 6,323,288 B1 * | 11/2001 | Ching et al. ................. 525/370 |

FOREIGN PATENT DOCUMENTS

| | | |
|---|---|---|
| WO | WO96/25058 | 8/1996 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

* cited by examiner

*Primary Examiner*—James J. Seidleck
*Assistant Examiner*—Sanza L. McClendon
(74) *Attorney, Agent, or Firm*—Williams, Morgan & Amerson, P.C.

(57) ABSTRACT

Herein is disclosed an oxygen scavenging composition, comprising an oxygen scavenging polymer comprising units having structure I:

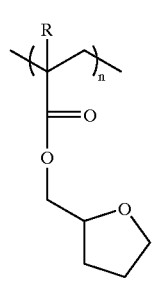

wherein R is selected from the group consisting of —H and —$C_1$–$C_6$ alkyls and n is an integer greater than or equal to 1; and an oxidation catalyst. The oxygen scavenging polymer can be used to form an oxygen scavenging packaging article.

40 Claims, 3 Drawing Sheets

OXYGEN SCAVENGING COMPOSITIONS COMPRISING POLYMERS DERIVED FROM TETRAHYDROFURFURYL MONOMERS

BACKGROUND OF THE INVENTION

1. Field of the Invention

The present invention relates generally to the field of oxygen scavenging compositions. More particularly, it concerns oxygen scavenging compositions comprising tetrahydrofurfuryl acrylate or vinyl tetrahydrofurfurylate monomers.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, technique for limiting oxygen exposure involves incorporating an oxygen scavenger into the packaging structure. One important class of oxygen scavengers is oxygen scavenging polymers. However, it has been found that some oxygen scavenging polymers, such as polybutadiene and similar polymers, generate fragments upon reaction with oxygen, and the fragments may enter the packaged product and impart an off-taste or malodor.

Ching et al., U.S. Pat. No. 5,627,239, discloses polymers comprising an ethylenic or polyethylenic backbone and hydrocarbyl moieties which contain ether and which are pendant or terminal to the backbone. These polymers, such as ethylene/methyl acrylate/tetrahydrofurfuryl acrylate terpolymer (EMTF), were prepared by reactive extrusion, which led to a crystalline product that underwent significant degradation during the reactive extrusion process.

For packaging oxygen-sensitive food products, it is desirable to eliminate oxygen in the package as soon as possible after the package is sealed. This requires the oxygen scavenger to scavenge oxygen at the highest possible rate and capacity upon initiation of scavenging. The EMTF random copolymer made by reactive extrusion, however, was only capable of scavenging less than 5 cc oxygen per gram of oxygen scavenging polymer in the first day, and about 100 cc oxygen per gram of oxygen scavenging polymer in the second day.

Therefore, it is desirable to have oxygen scavenging polymers that consume oxygen with the highest rate and capacity within the first few days after packaging and initiation in order to most effectively prevent the degradation of product associated with free oxygen in the package. In addition, the incorporation of an oxygen scavenging moiety into a polymer system through reactive extrusion can lead to degradation of the polymer as a result of the high process temperatures required for reactive extrusion. Reactive extrusion also is limited in that the level of incorporation of the oxygen scavenging moiety is determined by the reaction kinetics, and thus, less than 100% of the potential sites for incorporation of the oxygen scavenging moiety.

SUMMARY OF THE INVENTION

In one embodiment, the present invention relates to an oxygen scavenging composition, comprising: an oxygen scavenging polymer comprising units having structure I:

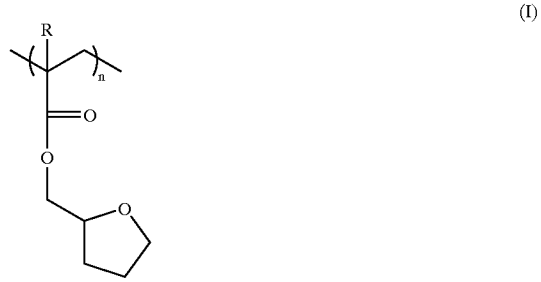

(I)

wherein R is selected from the group consisting of —H and —$C_1$–$C_6$ alkyls and n is an integer greater than or equal to 1; and,
an oxidation catalyst.

In another embodiment, the present invention relates to a packaging article, comprising:
an oxygen scavenging layer comprising an oxygen scavenging polymer comprising units having structure I, as described above.

In yet another embodiment, the present invention relates to a method of initiating oxygen scavenging by an oxygen scavenging composition, comprising:
(a) providing an oxygen scavenging composition, comprising:
  (i) an oxygen scavenging polymer comprising units having structure I, as described above;
  (ii) an oxidation catalyst, as described above, and
  (iii) an energy-absorbing compound selected from the group consisting of microwave reactive materials and photoinitiators having a wavelength of maximum absorption of electromagnetic radiation from about 200 nm to about 750 nm; and
(b) exposing the oxygen scavenging composition to electromagnetic radiation for a duration sufficient to initiate oxygen scavenging by the oxygen scavenging composition.

In still another embodiment, the present invention relates to a method of producing an oxygen scavenging polymer, comprising:
(a) polymerizing a monomer composition comprising monomers having structure II:

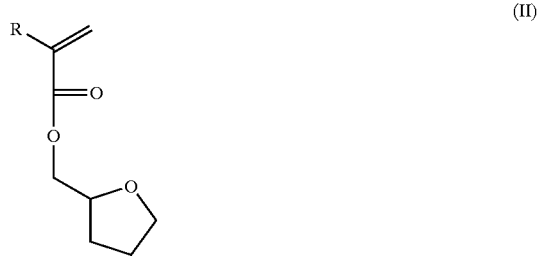

(II)

wherein R is selected from the group consisting of —H and —$C_1$–$C_6$ alkyls, to form an oxygen scavenging polymer.

The present invention provides an oxygen scavenging composition, and packaging articles comprising oxygen scavenging layers comprising the oxygen scavenging composition, which do not generate fragments upon reaction with oxygen. Further, the present invention provides a polymer preparable by direct polymerization, and not reactive extrusion, thus providing an amorphous polymer product with the potential of 100% incorporation of the oxygen scavenging moiety into the polymer and avoiding the problem of polymer degradation frequently found in reactive extrusion processes. The direct polymerization can typically be performed under mild conditions and is easily controlled. Further, the oxygen scavenging polymer of the present invention typically has a high scavenging rate and capacity in the first few days after initiation and package filling.

DESCRIPTION OF ILLUSTRATIVE EMBODIMENTS

Figure 1:
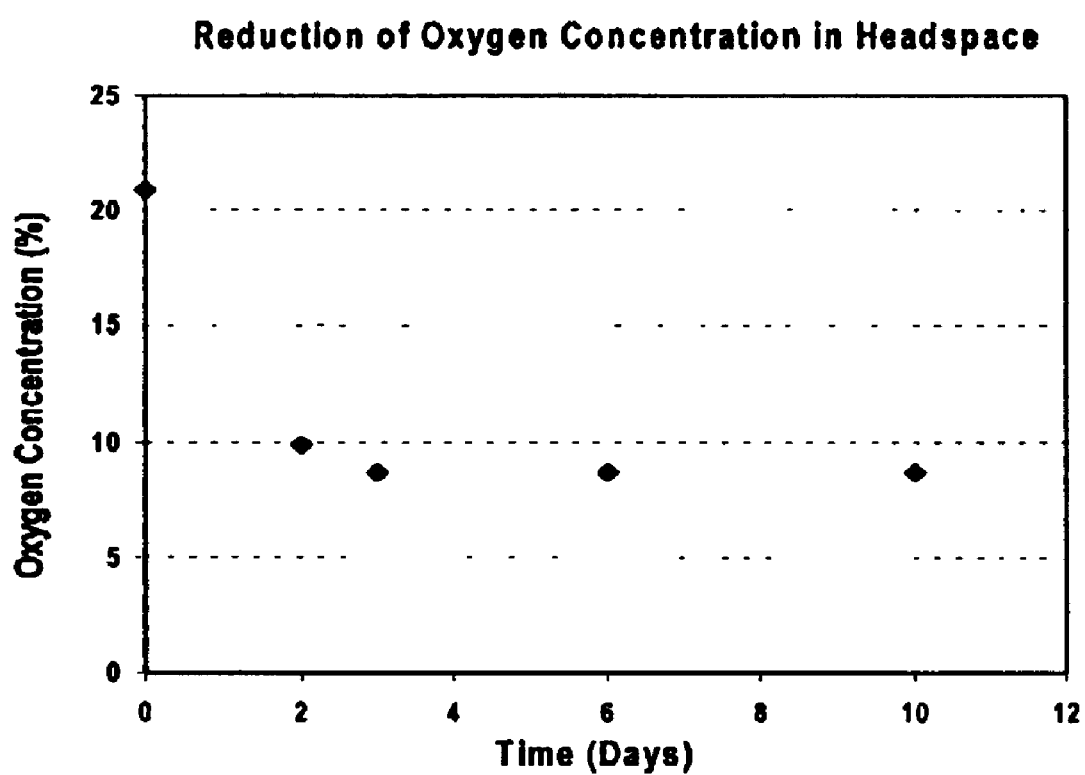
FIG. 1 plots the percent oxygen concentration as a function of time for a test beginning with 300 cc 20% oxygen at room temperature, as described in Example 4.

In one embodiment, the present invention relates to an oxygen scavenging composition, comprising an oxygen scavenging polymer comprising units having structure I:

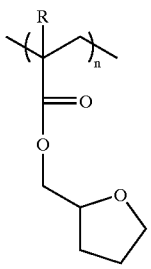

(I)

wherein R is selected from the group consisting of —H and —$C_1$–$C_6$ alkyls and n is an integer greater than or equal to 1; and, an oxidation catalyst.

Preferably, R is selected from the group consisting of —H and —$C_1$–$C_2$ alkyls.

In one preferred embodiment, the oxygen scavenging polymer consists essentially of units having structure I. By "consists essentially" in this context is meant that at least about 95 mol % of units of the polymer have structure I. Preferably, at least about 99 mol % of units of the polymer have structure I.

It has been observed that a polymer comprising units having structure I is capable of scavenging oxygen with a high rate and capacity, and thus, in addition to other applications, is useful in oxygen scavenging or active oxygen barrier packaging applications.

The polymer may further comprise other unit(s), wherein the other units may be any hydrocarbon or substituted hydrocarbon, preferably one having from about 1 to about 12 carbon atoms. By "substituted hydrocarbon" is meant a hydrocarbon comprising one or more heteroatoms, including, but not limited to, oxygen, silicon, and halogens, among others. Preferably, the other units are selected from the group consisting of ethylene, styrene, methyl acrylate, methyl methacrylate, vinyl acetate, and combinations thereof.

The proportion of units having structure I to other units may be from 1:99 mol % to 99:1 mol %. Preferably, the proportion of units having structure I to other units is from about 40:60 mol % to about 99:1 mol %. More preferably, the proportion of units having structure I to other units is from about 90:10 mol % to about 99:1 mol %.

The polymer of the oxygen scavenging composition may, by way of example and not to be construed as limiting, be a homopolymer of units having structure I, a copolymer of units having structure I and other units, or a terpolymer of units having structure I and two other units, among others.

Copolymers, terpolymers, and higher order polymers may be random or block polymers.

One preferred copolymer is poly(methyl methacrylate-co-tetrahydrofurfuryl methacrylate).

Preferably, the polymer is amorphous, and not crystalline. Though not to be bound by theory, it is generally held that oxygen diffuses faster through amorphous-phase polymers than crystalline-phase polymers. Therefore, an amorphous oxygen scavenging polymer of the present invention consumes oxygen faster than a crystalline oxygen scavenging polymer, which is highly beneficial in eliminating oxygen in a package in the first few days after initiation and package filling.

The oxygen scavenging composition comprises an oxidation catalyst. Preferably, the oxidation catalyst is a transition metal oxidation catalyst. The transition metal catalyzes oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate, preferably $C_{1-C20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1% (10 to 10,000 ppm) of the oxygen scavenging composition, based on the metal content only (excluding ligands, counterions, etc.).

The oxygen scavenging composition may also comprise an energy-absorbing compound selected from the group consisting of microwave reactive materials and photoinitiators having a wavelength of maximum absorption of electromagnetic radiation from about 200 nm to about 750 nm. Though not to be bound by theory, it is believed that energy-absorbing compounds of the group defined above absorb electromagnetic radiation and at least some of the energy of the electromagnetic radiation activates a chemical process or processes that induces oxygen scavenging by the oxygen scavenging polymer of the composition.

In situations where the energy-absorbing compound is a photoinitiator, the photoinitiator will have a wavelength of maximum absorption of electromagnetic radiation (meaning a wavelength at which the extinction coefficient of the photoinitiator is higher than at any other wavelength) from about 200 nm to about 750 nm. Electromagnetic radiation in this range of wavelengths is readily produced by apparatus that can be conveniently included into package-formation or -filling procedures. Electromagnetic radiation in this range of wavelengths may also provide other useful activities, such as sterilizing a package prior to filling or activating other chemical reactions in the package which may be desired by the user.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7—H-benz[de] anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the product).

Photoinitiators that are especially useful in the present invention include benzophenone derivatives containing at least two benzophenone moieties, as described in U.S. Pat. No. 6,139,770. These compounds act as effective photoinitiators to initiate oxygen scavenging activity in the oxygen scavenging layer of the present invention. Such benzophenone derivatives typically have a very low degree of extraction from the oxygen scavenging layer, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicyclic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$A_a(B)_b$ wherein A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as, for example, an ether, ketone, aldehyde, ester, or alcohol.

The substituents of B, herein R", when present, are individually selected from alkyl, aryl, alkoxy, phenoxy, or alicyclic groups containing from 1 to 24 carbon atoms, or halides. Each benzophenone moiety can have from 0 to 9 substituents.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

As stated above, the amount of photoinitiator can vary. In many instances, the amount will depend on the blend ratio or the particular oxygen scavenging polymer present in the oxygen scavenging composition, the wavelength and intensity of UV radiation used, the nature and amount of any antioxidants present in the oxygen scavenging composition, as well as the type of photoinitiator. The amount of photoinitiator also depends on the intended use of the composition. For instance, if the photoinitiator-containing composition is intended for use in a packaging article as a layer placed underneath a second layer which is somewhat opaque to the radiation used, more initiator may be needed. For most purposes, however, the amount of photoinitiator is in the range of 0.01 to 10% by weight of the oxygen scavenging layer.

In the situation where the energy-absorbing compound is a microwave reactive material, the composition can be exposed to microwaves, which are readily produced by apparatus that can be conveniently included into package-formation or -filling procedures. Microwaves may also provide other useful activities, such as sterilizing a package prior to filling or activating other chemical reactions in the package which may be desired by the user.

In certain preferred embodiments of the invention, the microwave reactive material is selected from the group consisting of metal materials and materials comprising polar compounds. Preferred polar compounds include water, peroxides, and peroxide solutions. Preferred peroxides include inorganic peroxides selected from the group consisting of sodium percarbonate, potassium percarbonate, calcium percarbonate, and sodium percarbonate, and organic peroxides selected from the group consisting of 2,5-dimethyl-2,5-di(benzoylperoxy) hexane; t-amyl peroxyacetate; t-amyl peroxybenzoate; t-butyl peroxyacetate; t-butyl peroxybenzoate; di-t-butyl diperoxyphthalate; 2,2-di-(t-butylperoxy) butane; 2,2-di(t-amylperoxy) propane; n-butyl 4,4-di(t-butylperoxy) valerate; ethyl 3,3-di-(t-amylperoxy) butyrate; ethyl 3,3-(t-butylperoxy) butyrate; di-α-cumyl peroxide; α-α'-di-(t-butylperoxy) diisopropylbenzene; 2,5-dimethyl-2,5-di-(t-butylperoxy) hexane; di-t-amyl peroxide; t-butyl α-cumyl peroxide; di-t-butyl peroxide; 2,5-dimethyl-2,5-di-(t-butylperoxy)-3-hexyne; di-t-butyl peroxide; di-t-amyl peroxide; and t-butyl hydroperoxide.

Where the microwave reactive material is a metal material, it can suitably be in a form selected from the group consisting of foils, powders, meshes, staples, buttons, and fibers. In some particularly preferred embodiments, the metal material comprises a powder selected from the group consisting of aluminum, copper, iron, and oxides thereof.

The oxygen scavenging composition can further comprise additional components, such as antioxidants and diluent polymers, among others. Some possible additional components are described below.

In another embodiment, the present invention relates to an oxygen scavenging packaging article, comprising:
an oxygen scavenging layer comprising an oxygen scavenging polymer comprising units having structure I:

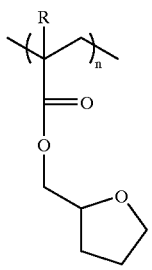

(I)

wherein R is selected from the group consisting of —H and —$C_1$–$C_6$ alkyls and n is an integer greater than or equal to 1; and,
an oxidation catalyst.

Packaging articles typically come in several forms including a single layer film, a multilayer film, a single layer rigid article, or a multilayer rigid article. Typical rigid or semi-rigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles either comprise single or multiple layers of material.

The packaging article comprising the oxygen scavenging layer can be used to package any product for which it is desirable to inhibit oxygen damage during storage, e.g. food, beverage, pharmaceuticals, medical products, corrodible metals, or electronic devices.

The packaging article comprising the oxygen scavenging layer can comprise a single oxygen scavenging layer, or an oxygen scavenging layer and additional layers, such as an oxygen barrier layer, a food-contact layer, a structural layer, or an adhesive layer, alone or in any combination. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques.

As stated above, the packaging article comprises an oxygen scavenging layer. In the oxygen scavenging layer of the oxygen scavenging packaging article, the polymer is as described above. The polymer thus may consist essentially of units having structure I, or it may comprise units having structure I and other units.

The oxygen scavenging layer may also comprise a transition metal oxidation catalyst, as described above. Alternatively, if a transition metal oxidation catalyst is desired to be included in the packaging article, and the packaging article is a multilayer article, the transition metal may be included in a layer of the packaging article adjacent to the oxygen scavenging layer.

The oxygen scavenging layer may also comprise an energy-absorbing compound, as described above.

Typically, the polymer comprises from about 5 wt % to 100 wt % of the oxygen scavenging layer. Preferably, the polymer comprises from about 20 wt % to about 80 wt % of the oxygen scavenging layer.

Other compounds may be used with the oxygen scavenging polymers of the present invention, in order to enhance the functionality of the oxygen scavenging polymers in storage, processing into a layer of a packaging article, or use of the packaging article. Such enhancements include, but are not limited to, limiting the rate of oxygen scavenging by the oxygen scavenging polymer prior to filling of the packaging article with a product, initiating oxygen scavenging by the oxygen scavenging polymer at a desired time, limiting the induction period (the period between initiating oxygen scavenging and scavenging of oxygen at a desired rate), or rendering the layer comprising the oxygen scavenging polymer stronger or more transparent, among others. These compounds can be added to the oxygen scavenging layer or another layer of the packaging article, as appropriate for the intended function of the compound.

Other additives can be added to further facilitate or control the initiation of oxygen scavenging properties. Also, additional components such as a structural polymer or polymers can be added to render the layer more adaptable for use in a packaging article. Particular additives and components to be included in the oxygen scavenging layer can be readily chosen by the skilled artisan, depending on the intended use of the oxygen scavenging layer and other parameters.

Antioxidants may be used to control scavenging initiation by the oxygen scavenging layer. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the oxygen scavenging layer, the packaging article (and incorporated energy-absorbing compound) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on oxygen scavenging. As mentioned earlier, such materials are usually present in oxidizable organic compounds or structural polymers to prevent oxidation or gelation of the polymers. Typically, they are present in about 0.01 to 1% by weight of the composition. However, additional amounts of antioxidant may also be added if it is desired to tailor the induction period as described above.

Other additives which can be included in the high oxygen barrier layer include, but are not necessarily limited to, fillers, pigments, dyestuffs, stabilizers, processing aids, plasticizers, fire retardants, and anti-fog agents, among others.

Any other additives employed normally will not comprise more than 10% of the oxygen scavenging layer by weight, with preferable amounts being less than 5% by weight of the oxygen scavenging layer.

The oxygen scavenging layer can also comprise film- or rigid-article-forming structural polymers. Such polymers are thermoplastic and render the oxygen scavenging layer more adaptable for use in a packaging article. They also may, to some extent, have oxygen scavenging properties. Suitable structural polymers include, but are not limited to, polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth) acrylates, ethylene-(meth)acrylic acid, or ethylene-(meth) acrylic acid ionomers. In rigid articles, such as beverage containers, PET is often used. Blends of different structural polymers may also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a structural polymer which is incompatible with the oxygen scavenging polymer.

Preferably, the structural polymer is PET.

Also, the oxygen scavenging layer can comprise an oxygen barrier polymer. Typical oxygen barrier polymers include poly(ethylene vinyl alcohol) (EVOH), polyacrylonitrile, polyvinyl chloride (PVC), poly(vinylidene dichloride), polyethylene terephthalate (PET), and polyamides.

The oxygen scavenging layer may be in the form of a layer, film, liner, coating, sealant, gasket, adhesive insert, non-adhesive insert, or fibrous mat insert in the packaging article.

The packaging article comprising the oxygen scavenging layer can comprise a single oxygen scavenging layer or an oxygen scavenging layer and additional layers. The additional layers of a multilayer material may comprise at least one oxygen barrier layer, i.e. a layer having an oxygen transmission rate equal to or less than 500 cubic centimeters per square meter ($cc/m^2$) per day per atmosphere at room temperature (about 25° C.). Typical oxygen barrier layers comprise poly(ethylene vinyl alcohol) (EVOH), polyacrylonitrile, polyvinyl chloride (PVC), poly(vinylidene dichloride), polyethylene terephthalate (PET), polyamides, silica, or mixtures thereof. If the oxygen barrier layer comprises EVOH, the packaging article preferably further comprises a moisture barrier layer. Any polymers capable of providing a moisture barrier and being formed into a layer of the packaging article may be used. The moisture barrier layer preferably comprises polyethylene, polyethylene terephthalate (PET), or a mixture thereof.

The additional layers of a multilayer material may comprise at least one structural layer, i.e. a layer imparting strength, rigidity, or other structural properties to the material. The structural layer can comprise polyethylene, low density polyethylene, very low density polyethylene, ultra-low density polyethylene, high density polyethylene, polypropylene, polyethylene terephthalate (PET), polyethylene naphthalate (PEN), nylon, polyvinyl chloride, ethylene-vinyl acetate, ethylene-alkyl (meth)acrylates, ethylene-(meth)acrylic acid, ethylene-(meth)acrylic acid ionomer, aluminum foil, or paperboard. PET, aluminum foil, or paperboard are preferred.

Other additional layers of the packaging article may include one or more layers which are permeable to oxygen.

Further additional layers, such as adhesive layers, may also be used. Compositions typically used for adhesive layers include anhydride functional polyolefins and other well-known adhesive layers.

The oxygen scavenging packaging article can be formed by any appropriate technique. By way of example, and not to be construed as limiting, forming the oxygen scavenging packaging article will involve preparing the oxygen scavenging composition and other compounds to be included therein, heating the composition to a temperature above the melting point of the polymer with stirring to produce a homogeneous melt, and subsequent formation of the packaging article or oxygen scavenging layer thereof from the melt. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques. Not all of these techniques requiring formation of a melt comprising the polymer. Other techniques for forming an oxygen scavenging packaging article of the present invention may be apparent to one of ordinary skill in the art.

In yet another embodiment, the present invention relates to a method of initiating oxygen scavenging by an oxygen scavenging composition, comprising:
(a) providing an oxygen scavenging composition, comprising:
(i) an oxygen scavenging polymer comprising units having structure I:

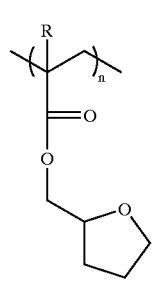

(I)

wherein R is selected from the group consisting of —H and —C$_1$–C$_6$ alkyls and n is an integer greater than or equal to 1;
(ii) an oxidation catalyst; and,
(iii) an energy-absorbing compound selected from the group consisting of microwave reactive materials and photoinitiators having a wavelength of maximum absorption of electromagnetic radiation from about 200 nm to about 750 nm; and
(b) exposing the oxygen scavenging composition to electromagnetic radiation for a duration sufficient to initiate oxygen scavenging by the oxygen scavenging composition.

The oxygen scavenging composition is as described above. Preferably, the oxygen scavenging composition comprises a transition metal oxidation catalyst, as described above. The energy-absorbing compound is preferably a photoinitiator selected from the group consisting of benzophenone derivatives containing at least two benzophenone moieties, as described above. The oxygen scavenging composition can be a solid or a melt, and as a solid it can be in the form of a packaging article or an oxygen scavenging layer thereof.

The exposure can be performed at any time between the formation of the composition and the filling with product of a packaging article formed from the composition. Preferably, the exposure is performed when the oxygen scavenging composition has been formed into a packaging article or an oxygen scavenging layer thereof. More preferably, the exposure is performed no more than 1 hr prior to filling of the packaging article with a product.

In the performance of the method, the oxygen scavenging composition, in whatever form it is provided, is exposed to electromagnetic radiation. Though not to be bound by theory, it is believed that electromagnetic radiation is absorbed by the energy-absorbing component of the oxygen scavenging composition, and at least some of the energy of the electromagnetic radiation drives chemical reactions that activate oxygen scavenging. Electromagnetic radiation of essentially any peak wavelength (i.e., the wavelength of maximum intensity) can be used.

The optimal duration of the exposure will depend on the peak wavelength of the electromagnetic radiation, the wavelength of maximum absorption of the energy-absorbing compound, the intensity of the electromagnetic radiation, and the geometry of the radiation source and the composition, among other parameters apparent to one of ordinary skill in the art. The duration can be readily adjusted by adjusting one or more of the parameters as the user may desire.

The closer the peak wavelength of the electromagnetic radiation is to the wavelength of maximum absorption of the energy-absorbing compound, the greater the fraction of the electromagnetic radiation's energy that will be absorbed. Thus, either less intense electromagnetic radiation, a shorter duration of exposure, or both are possible, relative to the situation where the peak wavelength of the electromagnetic radiation is further from the wavelength of maximum absorption of the energy-absorbing compound. Preferably, the electromagnetic radiation has a peak wavelength from about 50 nm shorter than the wavelength of maximum absorption of the energy-absorbing compound to about 50 nm longer than the wavelength of maximum absorption of the energy-absorbing compound. More preferably, the electromagnetic radiation has a peak wavelength from about 10 nm shorter than the wavelength of maximum absorption of the energy-absorbing compound to about 10 nm longer than the wavelength of maximum absorption of the energy-absorbing compound.

The electromagnetic radiation can be provided by any appropriate source.

In yet another embodiment, the present invention relates to a method of producing an oxygen scavenging polymer, comprising:
(a) polymerizing a monomer composition comprising monomers having structure II:

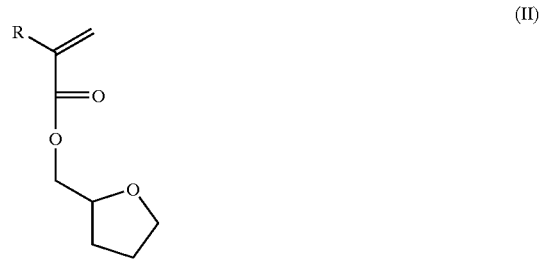

(II)

wherein R is selected from the group consisting of —H and —C$_1$–C$_6$ alkyls, to form an oxygen scavenging polymer. The resulting polymer will have an ethylenic backbone with tetrahydrofurfuryl methacrylate pendant groups.

The monomers having structure II may be synthesized through known chemical processes, or may be purchased from commercial suppliers, such as Penn Specialty Chemicals, Inc., Memphis, Tenn. The polymerizing step may involve forming a homopolymer from the monomers having structure II, or, if additional monomer(s) other than those having structure II are used, a copolymer, terpolymer, or higher order polymer can be formed. In the polymerizing step, the monomer composition may further include solvents; polymerization initiators or catalysts, such as free radical initiators, Ziegler-Natta catalysts, or metallocene polymerization catalysts; suspending agents; surfactants; and other compounds that one of ordinary skill in the art will recognize may be desirable for use in polymerization, depending on the polymerization technique used. The monomer composition may consist essentially of monomers having structure II, by which is meant that only monomers having structure II will be incorporated into the polymer.

Polymerization may be performed by any appropriate technique, such as free radical polymerization (see, for example, a copolymer made from furfuryl acrylate (THF acrylate) and 2-hydroxyl-methacrylate: Zaldivar et al., *J. Polymer Sci.*, Part A: Polymer Chemistry, 31:625–631, 1993), Ziegler-Natta polymerization, or metallocene polymerization, and can be performed in solution, suspension, emulsion, bulk, or gas-phase, as appropriate and desired.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Materials

All starting materials were purchased from Aldrich and used without purification unless noted.

Example 1
Synthesis of Oxygen Scavenging Poly(Tetrahydrofurfuryl Methacrylate)

100 parts tetrahydrofurfuryl methacrylate and 100 parts toluene were charged to a three neck round bottom flask equipped with a stir bar. The reaction vessel was then deoxygenated via nitrogen purge for 20 minutes at room temperature. Next, 0.225 parts azobisisobutyrnitrile were added, and the reaction flask was fitted with a condenser. The vessel was then heated at 80° C. for 5 hr. The reaction solution was added dropwise to agitated methanol. The polymer precipitate was then dissolved in methylene chloride and then reprecipitated in methanol under agitation. The product was dried in a vacuum oven at room temperature overnight to remove volatile solvents. $^1$H-NMR (300 MHz, CDCl$_3$) δ(ppm): 1.0–1.6 (m, 6H), 1.75 (s, 3H), 3.9 (m, 2H), 4.0 (t, 1H), 4.2 (s, 2H).

Example 2
Synthesis of Oxygen Scavenging Poly(methyl methacrylate-co-tetrahydrofurfuryl methacrylate)

100 parts methyl methacrylate, 100 parts tetrahydrofurfuryl methacrylate, and 200 parts toluene were charged to a three neck round bottom flask equipped with a stir bar. The reaction vessel was then deoxygenated via nitrogen purge for 20 minutes at room temperature. Thereafter, 0.45 parts of azobisisobutyrnitrile were added, and the reaction flask was fitted with a condenser. The vessel was then heated at 80° C. for 5 hr. The reaction solution was added dropwise to methanol. The polymer was then dissolved in methylene chloride and then reprecipitated in methanol. The product was dried in a vacuum oven at room temperature overnight to remove volatile solvents. $^1$H-NMR (300 MHz, CDCl$_3$) δ(ppm): 1.4–2.1 (m, 7H), 2.8 (m, 1H), 3.2 (m, 1H), 3.6 (m, 1H), 4.10 (d, 2), 5.75 (s, 2H).

Example 3
Synthesis of Oxygen Scavenging Poly(methyl methacrylate-co-tetrahydrofurfuryl methacrylate)

100 parts methyl methacrylate, 20 parts tetrahydrofurfuryl methacrylate, and 240 parts toluene were charged to a three neck round bottom flask equipped with a mechanical stirrer. The reaction vessel was then deoxygenated via nitrogen purge for 20 minutes at room temperature. Next, 0.6 parts azobisisobutyrnitrile were added, and the reaction flask was fitted with a condenser. The vessel was then heated at 80° C. for 5 hr. The reaction solution was added dropwise to the agitated methanol. The polymer was then dissolved in methylene chloride and then reprecipitated in methanol under agitation. The product was dried in a vacuum oven at room temperature overnight to remove volatile solvents. $^1$H-NMR (300 MHz, CDCl$_3$) δ(ppm): 1.4–2.1 (m, 7H), 2.8 (m, 1H), 3.2 (m, 1H), 3.6 (m, 1H), 4.10 (d, 2H), 5.75 (s, 2H).

Example 4
Head Space Oxygen Scavenging by Poly(tetrahydrofurfuryl methacrylate) Film Sample Film samples were cast from a solution of 2.50 polymer sample from Example 1, 10 g methylene chloride, 0.06 g cobalt oleate, and 0.003 g tribenzoylated triphenylbenzene. For headspace oxygen scavenging testing, a sample weight of 0.5 g film sample was used. The film sample was first irradiated for 2 min under a UV lamp with an intensity of 9.5 mW/cm$^2$ and a peak wavelength of 254 nm. The UV-treated film sample (0.5 g) was then sealed into a leak-proof aluminum bag and the bag was evacuated by applying a vacuum. Then, 300 cc testing gas (either air or 1% oxygen in nitrogen) was introduced into the bag, and the oxygen concentration in the testing bag was periodically analyzed using a Mocon HS750 Headspace Oxygen Analyzer. The oxygen scavenging performance of the prepared film sample was first tested in air at room temperature over a period of two weeks. This is illustrated in FIG. 1, which indicates that the most significant reduction in oxygen concentration occurred in the first day and most of the oxygen scavenging action was completed within the first 3 days.

Figure 2:
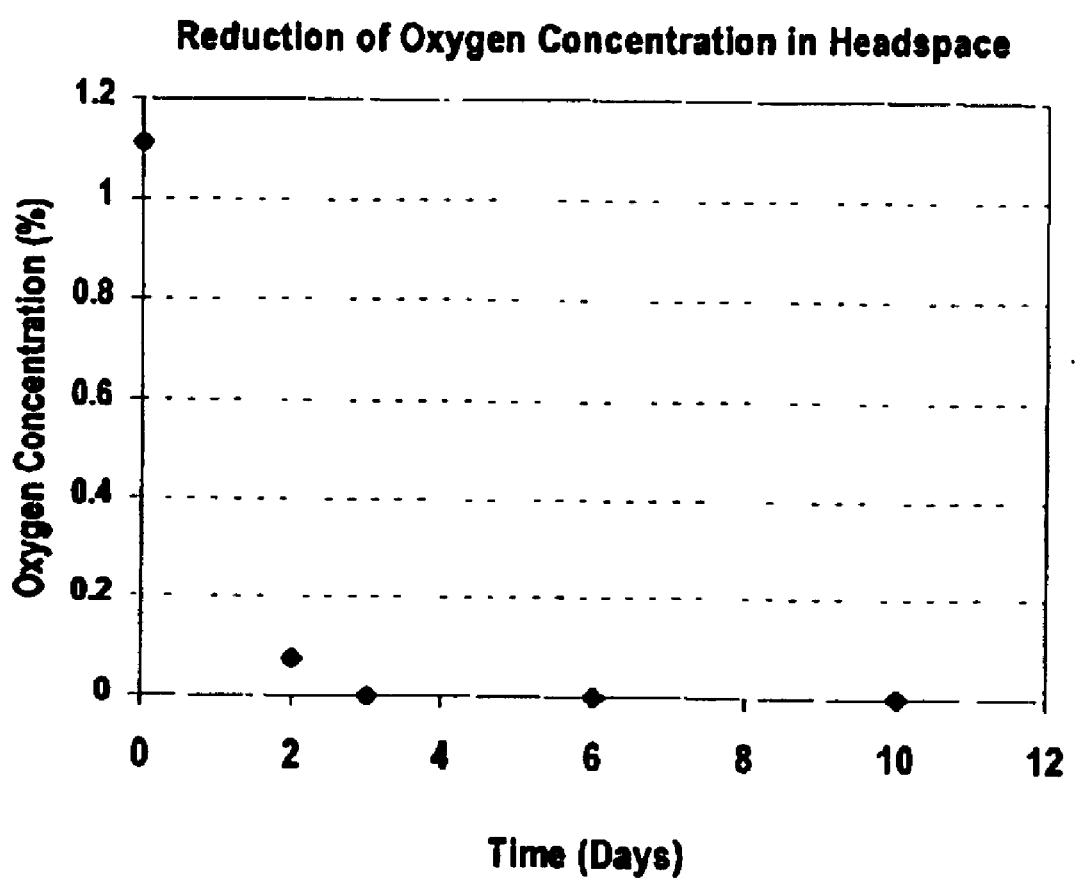
FIG. 2 plots the percent oxygen concentration as a function of time for a test beginning with 300 cc 1% oxygen at 4° C., as described in Example 4.

From the same set of data, the oxygen scavenging capacity, or the amount of oxygen scavenged per gram film sample, was plotted in FIG. 2. This shows that 64 cc oxygen was consumed by each gram film sample in the first day, and 82 cc oxygen was consumed by each gram film in the third day. It indicated that most of the scavenging activity was complete within the first 3 days. In contrast, the copolymer made from the reactive extrusion process as disclosed by Ching et al., U.S. Pat. No. 5,627,239 consumed only about 5 cc oxygen by each gram sample, and about 22 cc in the third day of testing. As described before, it is desirable that the trapped oxygen in the packaging system be eliminated as early as possible, and the oxygen scavenging composition of the present invention showed a desirable advantage in eliminating oxygen at a significantly higher rate than the comparative copolymer of Ching.

Figure 3:
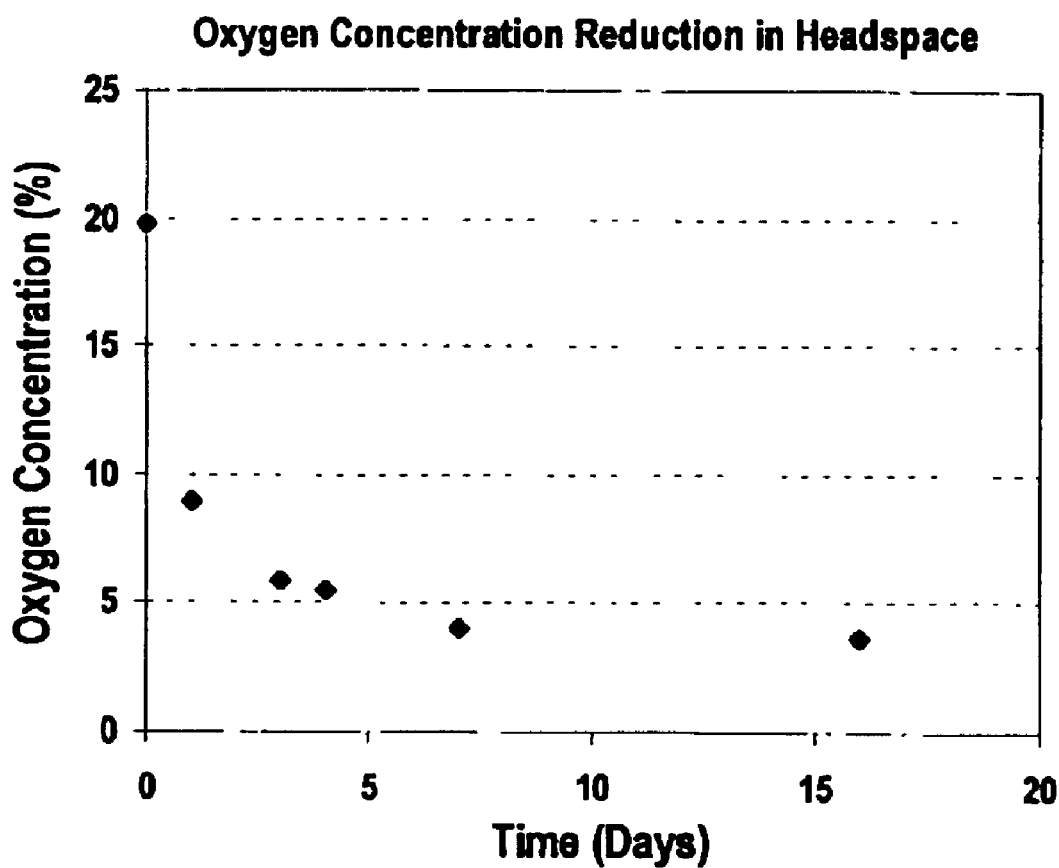
FIG. 3 plots the percent oxygen concentration as a function of time for a test beginning with 300 cc air at room temperature, as described in Example 4.

To evaluate the oxygen scavenging efficiency in low oxygen concentration and at lower temperature, an additional testing was conducted in 1% oxygen (balance nitrogen) at 4° C., with results shown in FIG. 3. In this case, the oxygen was eliminated completely within the first day and the lower temperature and low concentration did not appear to slow down the scavenging activity.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen scavenging composition, comprising:
   an oxygen scavenging polymer comprising from about 40 mol % to 100 mol % units having structure I:

(I)

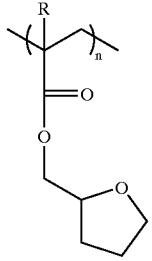

wherein R is selected from the group consisting of —H and —C$_1$–C$_6$ alkyls and n is an integer greater than or equal to 1; and
an oxidation catalyst.

2. The oxygen scavenging composition of claim 1, wherein the oxygen scavenging polymer consists essentially of units having structure I.

3. The oxygen scavenging composition of claim 1, wherein the oxidation catalyst is a transition metal oxidation catalyst.

4. The oxygen scavenging composition of claim 3, wherein the transition metal oxidation catalyst is a cobalt salt.

5. The oxygen scavenging composition of claim 4, wherein the cobalt salt is selected from the group consisting of cobalt oleate, cobalt stearate, and cobalt neodecanoate.

6. The oxygen scavenging composition of claim 1, further comprising an energy-absorbing compound selected from the group consisting of microwave reactive materials and photoinitiators having a wavelength of maximum absorption of electromagnetic radiation from about 200 nm to about 750 nm.

7. The oxygen scavenging composition of claim 6, wherein the energy-absorbing compound is a photoinitiator selected from the group consisting of benzophenone derivatives containing at least two benzophenone moieties and having the formula:

$$A_a(B)_b$$ 

wherein
A is a bridging group selected from sulfur; oxygen; carbonyl; —SiR''$_2$—, wherein each R'' is individually selected from alkyl groups containing from 1 to 12 carbon atoms, aryl groups containing 6 to 12 carbon atoms, or alkoxy groups containing from 1 to 12 carbon atoms; —NR'''—, wherein R''' is an alkyl group containing 1 to 12 carbon atoms, an aryl group containing 6 to 12 carbon atoms, or hydrogen; or an organic group containing from 1 to 50 carbon atoms;
a is an integer from 0 to 11;
B is a substituted or unsubstituted benzophenone group; and
b is an integer from 2 to 12.

8. The oxygen scavenging composition of claim 7, wherein the photoinitiator is selected from the group consisting of dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

9. The oxygen scavenging composition of claim 1, wherein R is —H and the polymer consists essentially of units having structure I.

10. The oxygen scavenging composition of claim 1, wherein R is —H and the polymer further comprises methyl methacrylate units.

11. A packaging article, comprising:
an oxygen scavenging layer comprising an oxygen scavenging polymer comprising from about 40 mol % to 100 mol % units having structure I:

(I)

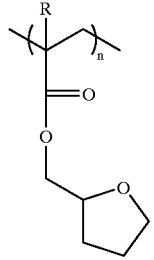

wherein R is selected from the group consisting of —H and —C$_1$–C$_6$ alkyls and n is an integer greater than or equal to 1; and,
an oxidation catalyst.

12. The packaging article of claim 11, wherein the oxygen scavenging polymer consists essentially of units having structure I.

13. The packaging article of claim 11, wherein the oxidation catalyst is a transition metal oxidation catalyst.

14. The packaging article of claim 13, wherein the transition metal oxidation catalyst is a cobalt salt.

15. The packaging article of claim 14, wherein the cobalt salt is selected from the group consisting of cobalt oleate, cobalt stearate, and cobalt neodecanoate.

16. The packaging article of claim 11, further comprising an energy-absorbing compound selected from the group consisting of microwave reactive materials and photoinitiators having a wavelength of maximum absorption of electromagnetic radiation from about 200 nm to about 750 nm in the oxygen scavenging layer.

17. The packaging article of claim 16, wherein the energy-absorbing compound is a photoinitiator selected from the group consisting of benzophenone derivatives containing at least two benzophenone moieties and having the formula:

$$A_a(B)_b$$ 

wherein

A is a bridging group selected from sulfur; oxygen; carbonyl; —SiR''$_2$—, wherein each R'' is individually selected from alkyl groups containing from 1 to 12 carbon atoms, aryl groups containing 6 to 12 carbon atoms, or alkoxy groups containing from 1 to 12 carbon atoms; —NR'''—, wherein R'' is an alkyl group containing 1 to 12 carbon atoms, an aryl group containing 6 to 12 carbon atoms, or hydrogen; or an organic group containing from 1 to 50 carbon atoms;

a is an integer from 0 to 11;

B is a substituted or unsubstituted benzophenone group; and b is an integer from 2 to 12.

18. The packaging article of claim 17, wherein the photoinitiator is selected from the group consisting of dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

19. The packaging article of claim 11, further comprising an antioxidant in the oxygen scavenging layer.

20. The packaging article of claim 19, wherein the antioxidant is selected from the group consisting of 2,6-di(t-butyl)-4-methylphenol(BHT), 2,2'-methylene-bis 6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate.

21. The packaging article of claim 11, wherein the oxygen scavenging layer further comprises an oxygen barrier polymer selected from the group consisting of poly(ethylene vinyl alcohol) (EVOH), polyacrylonitrile, polyvinyl chloride (PVC), poly(vinylidene dichloride), polyethylene terephthalate (PET), and polyamide.

22. The packaging article of claim 11, further comprising an oxygen barrier layer.

23. The packaging article of claim 22, wherein the oxygen barrier layer comprises poly(ethylene vinyl alcohol) (EVOH), polyacrylonitrile, polyvinyl chloride (PVC), poly (vinylidene dichloride), polyethylene terephthalate (PET), or polyamide.

24. The packaging article of claim 23, wherein the oxygen barrier layer comprises EVOH, and the packaging article further comprises a moisture barrier layer.

25. The packaging article of claim 24, wherein the moisture barrier layer comprises polyethylene, polyethylene terephthalate (PET), or a mixture thereof.

26. The packaging article of claim 11, further comprising a structural layer.

27. The packaging article of claim 26, wherein the structural layer comprises polyethylene, low density polyethylene, very low density polyethylene, ultra-low density polyethylene, high density polyethylene, polypropylene, polyethylene terephthalate (PET), polyethylene naphthalate (PEN), nylon, polyvinyl chloride, ethylene-vinyl acetate, ethylene-alkyl (meth)acrylates, ethylene-(meth)acrylic acid, ethylene-(meth)acrylic acid ionomers, aluminum foil, or paperboard.

28. The packaging article of claim 27, wherein the structural layer comprises PET, aluminum foil, or paperboard.

29. The packaging article of claim 11, wherein the oxygen scavenging layer is a liner, coating, sealant, gasket, adhesive insert, non-adhesive insert, or fibrous mat insert in the packaging article.

30. The packaging article of claim 11, wherein the packaging article is in the form of a single layer film, a multilayer film, a single layer rigid article, or a multilayer rigid article.

31. A method of initiating oxygen scavenging by an oxygen scavenging composition, comprising:
   (a) providing an oxygen scavenging composition, comprising:
      (i) an oxygen scavenging polymer comprising from about 40 mol % to 100 mol % units having structure I:

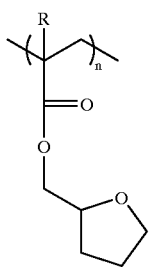

(I)

wherein R is selected from the group consisting of —H and —$C_1$–$C_6$ alkyls and n is an integer greater than or equal to 1;
      (ii) an oxidation catalyst; and,
      (iii) an energy-absorbing compound selected from the group consisting of microwave reactive materials and photoinitiators having a wavelength of maximum absorption of electromagnetic radiation from about 200 nm to about 750 nm; and
   (b) exposing the oxygen scavenging composition to electromagnetic radiation for a duration sufficient to initiate oxygen scavenging by the oxygen scavenging composition.

32. The method of claim 31, wherein the electromagnetic radiation has a peak wavelength from about 50 nm shorter than the wavelength of maximum absorption of the energy-absorbing compound to about 50 nm longer than the wavelength of maximum absorption of the energy-absorbing compound.

33. The method of claim 32, wherein the electromagnetic radiation has a peak wavelength from about 10 nm shorter than the wavelength of maximum absorption of the energy-absorbing compound to about 10 nm longer than the wavelength of maximum absorption of the energy-absorbing compound.

34. The method of claim 31, wherein the oxidation catalyst is a transition metal oxidation catalyst.

35. The method of claim 34, wherein the transition metal oxidation catalyst is a cobalt salt.

36. The method of claim 35, wherein the cobalt salt is selected from the group consisting of cobalt oleate, cobalt stearate, and cobalt neodecanoate.

37. The method of claim 31, wherein the energy-absorbing compound is a photoinitiator selected from the group consisting of benzophenone derivatives containing at least two benzophenone moieties and having the formula:

$$A_a(B)_b$$

wherein
   A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;
   a is an integer from 0 to 11;
   B is a substituted or unsubstituted benzophenone group; and
   b is an integer from 2 to 12.

38. The method of claim 37, wherein the photoinitiator is selected from the group consisting of dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

39. A method of producing an oxygen scavenging polymer, comprising:
   (a) polymerizing a monomer composition comprising from about 40 mol % to 100 mol % monomers having structure II:

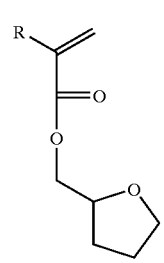

(II)

wherein R is selected from the group consisting of —H and —$C_1$–$C_6$ alkyls, to form an oxygen scavenging polymer.

40. The method of claim 39, wherein the monomer composition consists essentially of units having structure II.

* * * * *

UNITED STATES PATENT AND TRADEMARK OFFICE
CERTIFICATE OF CORRECTION

PATENT NO. : 6,746,622 B2
DATED : June 8, 2004
INVENTOR(S) : Hu Yang, Ta Yen Ching and Lennard Torres It is certified that error appears in the above-identified patent and that said Letters Patent is hereby corrected as shown below:

Column 16,
Line 30, delete "R''''" and insert -- R''' --.

Column 16,
Line 50, delete "2,2'-methylene-bis 6-t-butyl-" and insert -- 2,2'-methylene-bis(6-t-butyl- --.

Signed and Sealed this

Thirtieth Day of November, 2004

JON W. DUDAS
*Director of the United States Patent and Trademark Office*